US009426117B2

(12) United States Patent
Wang

(10) Patent No.: US 9,426,117 B2
(45) Date of Patent: Aug. 23, 2016

(54) FIREWALL SECURITY BETWEEN VIRTUAL DEVICES

(71) Applicant: Hangzhou H3C Technologies Co., Ltd., Hangzhou, Zhejiang (CN)

(72) Inventor: Qiyong Wang, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/391,166

(22) PCT Filed: Mar. 28, 2013

(86) PCT No.: PCT/CN2013/073303
§ 371 (c)(1),
(2) Date: Oct. 7, 2014

(87) PCT Pub. No.: WO2014/000483
PCT Pub. Date: Jan. 3, 2014

(65) Prior Publication Data
US 2015/0074788 A1    Mar. 12, 2015

(30) Foreign Application Priority Data

Jun. 29, 2012 (CN) .......................... 2012 1 0226717

(51) Int. Cl.
*G06F 9/00* (2006.01)
*H04L 29/06* (2006.01)
*G06F 9/455* (2006.01)

(52) U.S. Cl.
CPC ........... *H04L 63/02* (2013.01); *G06F 9/45558* (2013.01); *H04L 63/20* (2013.01); *G06F 2009/45587* (2013.01); *G06F 2009/45595* (2013.01)

(58) Field of Classification Search
CPC ................................................. H04L 29/06557
USPC ............................................................ 726/11
See application file for complete search history.

(56) References Cited

U.S. PATENT DOCUMENTS 7,333,482 B2    2/2008 Johansson et al.
7,516,475 B1    4/2009 Chen et al.
(Continued)

FOREIGN PATENT DOCUMENTS

CN    1697396    11/2005
CN    101800730    8/2010
(Continued)

OTHER PUBLICATIONS

"Cisco Data Center Services Node Architecture", Cisco Systems, Inc. 2010.
(Continued)

*Primary Examiner* — Christopher Brown
(74) *Attorney, Agent, or Firm* — Hewlett Packard Enterprise Patent Development

(57) ABSTRACT

When communication from a first virtual device to a second virtual device is received, it is determined a first virtual interface associated with the first virtual device and a second virtual interface associated with the second virtual device. It is then determined a first security domain associated with the first virtual interface and a second security domain associated with the second virtual interface to implement a security policy between the first security domain and second security domain. The communication between the virtual devices is allowed or blocked.

10 Claims, 7 Drawing Sheets

(56) References Cited

U.S. PATENT DOCUMENTS

| | | |
|---|---|---|
| 8,166,474 B1 | 4/2012 | Delco et al. |
| 8,190,755 B1 * | 5/2012 | Satish .................. H04L 63/102 709/225 |
| 8,213,336 B2 | 7/2012 | Smith et al. |
| 8,274,912 B2 | 9/2012 | Wray et al. |
| 2006/0005185 A1 | 1/2006 | Nguyen |
| 2009/0031222 A1 | 1/2009 | Nakamura et al. |
| 2009/0249438 A1 | 10/2009 | Litvin et al. |
| 2012/0163388 A1 | 6/2012 | Goel et al. |
| 2013/0019277 A1 * | 1/2013 | Chang ................ H04L 63/0218 726/1 |

FOREIGN PATENT DOCUMENTS

| | | |
|---|---|---|
| CN | 102244622 | 11/2011 |
| CN | 102307246 | 1/2012 |
| CN | 102710669 | 10/2012 |
| WO | WO2012/035067 | 3/2012 |

OTHER PUBLICATIONS

"It's Time to Virtualize the Network", Nicira, 2012.
International Search Report and Written Opinion dated Jul. 11, 2013 issued on PCT Patent Application No. PCT/CN2013/073303 dated Mar. 28, 2013, The State Intellectual Property Office the P.R. China.
Metzler, Jim, "The Challenges of Managing Virtualized Server Environments", Nov. 2009.
CN First Office Action dated May 18, 2015, CN Patent Application No. 201210226717.9 dated Jun. 29, 2012, State Intellectual Property Office of the P.R. China.
Extended European Search Report dated Dec. 2, 2015, EP Patent Application No. 13810155.5 dated Mar. 28, 2013, European Patent Office.

* cited by examiner

FIREWALL SECURITY BETWEEN VIRTUAL DEVICES

CROSS-REFERENCE TO RELATED APPLICATION

The present application is a 371 application of International Application No. PCT/CN2013/073303 filed on Mar. 28, 2013 and entitled "Firewall Security Between Virtual Devices," which claims benefit of Chinese Patent App. No. CN 201210226717.9 filed on Jun. 29, 2012.

BACKGROUND

In virtualization, a physical device is virtualized to create multiple virtual or logical devices. The virtual devices are assigned to different users so as to provide different services. Virtualization is beneficial in many applications, such as in a cloud computing environment where many concurrent users and services are supported.

BRIEF DESCRIPTION OF DRAWINGS

Non-limiting example(s) will be described with reference to the following, in which.

DETAILED DESCRIPTION

The present disclosure provides a method and a device for firewall security between virtual devices on a physical device. When communication from a first virtual device to a second virtual device is received, a first virtual interface associated with the first virtual device and a second virtual interface associated with the second virtual device are determined. Next, a first security domain associated with the first virtual interface and a second security domain associated with the second virtual interface are determined to implement a security policy between the first security domain and second security domain to allow or block the communication.

Using the first and second virtual interfaces, the first and second virtual devices on the same physical device may be separated or partitioned into different security domains. This allows implementation of security policies between different security domains to protect the virtual devices against possible security threats.

Figure 1:
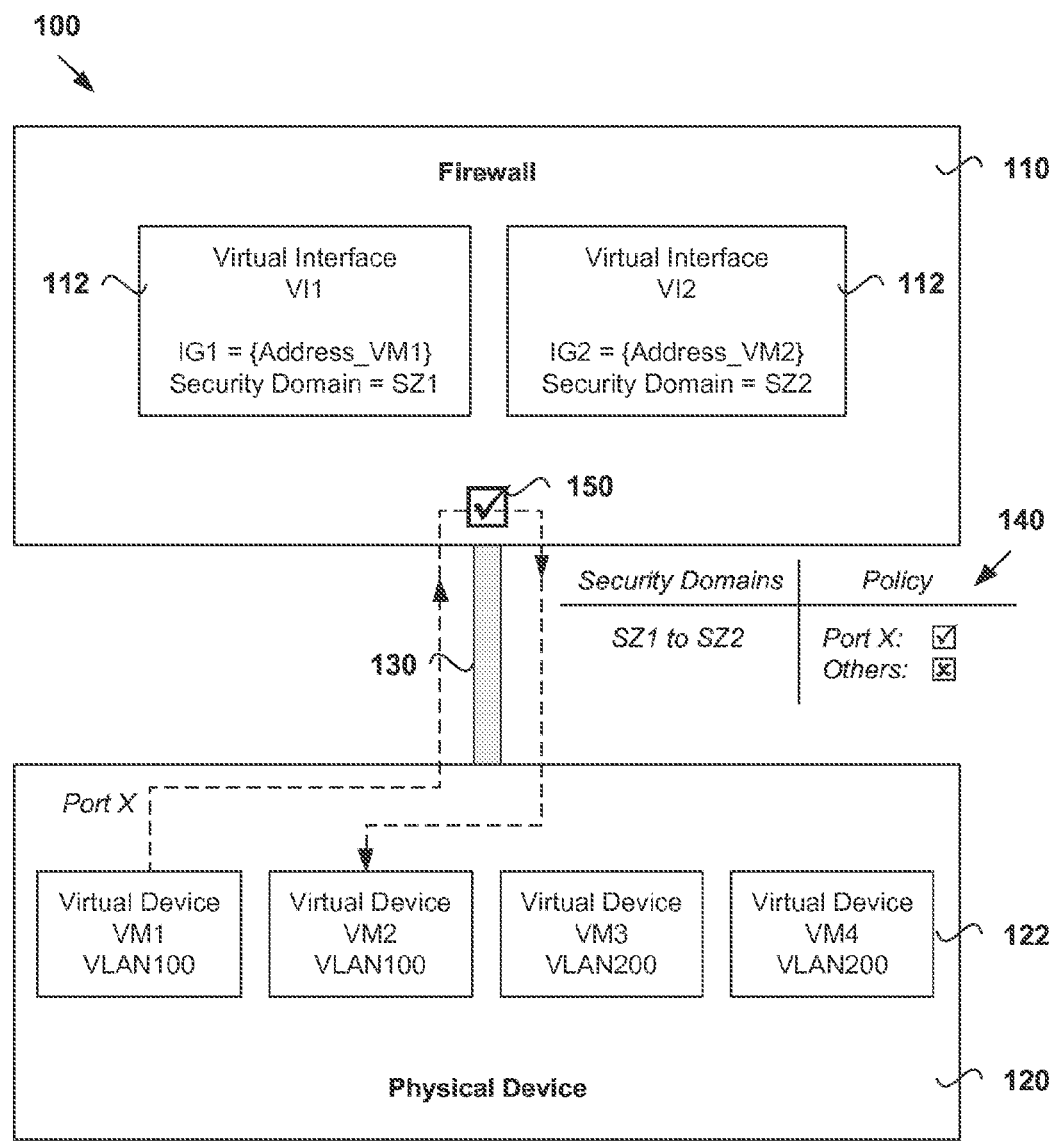
FIG. 1 is a block diagram of an example network for firewall security between virtual devices.

For example, FIG. 1 is a block diagram of an example network 100 that includes a firewall device 110, and a connecting physical device 120 that is virtualized into a plurality of virtual devices 122. The physical device 120 may be any physical device suitable for virtualization, such as a physical server etc. In the example in FIG. 1, the physical device 120 is a physical server virtualized into four virtual servers 122, i.e. VM1, VM2, VM3 and VM4. The virtual devices 122 share the same physical interface 130 (e.g. Ethernet port) to connect to the firewall device 110.

The virtual devices 122 provide services to different users or hosts. For example, VM1 and VM2 provide services to users of virtual local area network (VLAN) VLAN 100, while VM3 and VM4 to that of VLAN 200. Virtual devices 122 may need to communicate with each other to facilitate various services. In the example in FIG. 1, virtual device VM1 ("first virtual device" or source) wishes to communicate with virtual device VM2 ("second virtual device" or destination).

Figure 2:
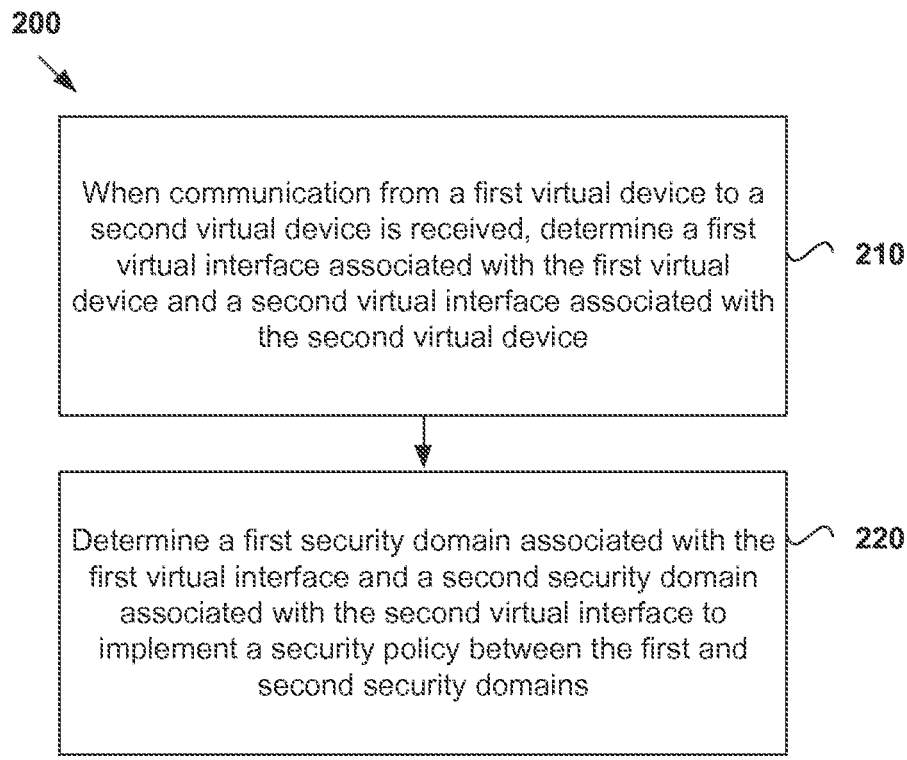
FIG. 2 is a flowchart of an example method for firewall security between virtual devices.

The firewall device 110 may block or allow communication between the virtual devices 122 via the virtual interfaces 112. Referring also to FIG. 2, an example method 200 for firewall security between the virtual devices 122 is provided.

At block 210, when the firewall device 110 receives communication from the first virtual device 122 (i.e. VM1 in FIG. 1) to the second virtual device 122 (i.e. VM2), the firewall device 110 determines a first virtual interface (i.e. VI1) associated with VM1 and a second virtual interface (i.e. VI2) associated with VM2.

At block 220, the firewall device 110 then determines a first security domain (i.e. SZ1) associated with the first virtual interface (i.e. VI1), and a second security domain (i.e. SZ2) associated with the second virtual interface (i.e. VI2). This allows the firewall device 110 to implement a security policy 140 between the security domains (i.e. SZ1 and SZ2). In the example in FIG. 1, the security policy 140 is to allow communication from SZ1 to SZ2 via TCP Port X. Communication via other TCP ports is blocked.

In the example in FIG. 1, based on virtual interfaces VI1 and VI2, the firewall device 110 is able to recognize that virtual devices VM1 and VM2 belong to different security domains SZ1 and SZ2 respectively. Otherwise, since the virtual devices 122 in FIG. 1 are connected to the firewall device 110 via the same physical interface 130, the firewall device 110 would not be able to identify the different security domains. Further, this facilitates deep or in-depth security control in the network.

The firewall device 110 may use the first and second virtual interfaces 112 as labels for incoming and outgoing interfaces for the received communication respectively to determine the corresponding security domains and security policy 140. That is, the virtual interfaces 112 are used as internal or temporary labels by the firewall device 110.

In the example in FIG. 1, since TCP Port X is used, the original incoming and outgoing interfaces of the communication are both TCP Port X. After determining the first virtual interface (i.e. VI1) and second virtual interface (i.e. VI2), firewall device 110 temporarily sets the incoming interface of the received communication as VI1, and the outgoing interface as VI2. Based on VI1 and VI2, the firewall device 110 determines SZ1 and SZ2, and the corresponding security policy 140 between SZ1 and SZ2. It should be understood that the virtual interfaces 112 not used when the communication is forwarded. For example, when the communication from VM1 is forwarded to VM2, TCP Port X instead of VI2 is used as the outgoing interface.

The example method in FIG. 2 may be used in any suitable services, applications and environments etc., such as at a cloud-based data centre. The virtual interface 112 may be a software entity or component with features of a physical interface, similar to a VLAN (virtual local area network) interface. For example, the virtual interface 112 may be a virtual port etc.

Throughout the present disclosure, the terms "firewall" and "firewall device" refer to any suitable type of firewall, such as a firewall located at a gateway, firewall located in a router or switch, or firewall located on a server. The location of the firewall 110 is not intended to be limiting in respect to the examples provided. For example while shown in FIG. 1 as physically separate from the device 120 hosting the virtual machines, in other examples the firewall device 110 and the virtual machines 122 could be hosted by the same physical device 120.

The term "security domain" refers to a group of devices (e.g. virtual devices) in a network that share common security policies. The terms "security policy", "security strategy" and "security control policy" refer generally to rules, mechanisms or techniques used by the firewall device 110 to determine if a particular communication through the firewall device 110 should be allowed or blocked. The term "communication" includes message or packet communication.

Non-limiting examples of blocks 210 and 220 will now be explained with reference to the detailed flowchart in FIG. 3 below. Blocks 310 and 320 in FIG. 3 are example detailed implementations of blocks 210 and 220 in FIG. 2 respectively.

Configuring Virtual Interfaces 302

Figure 3:
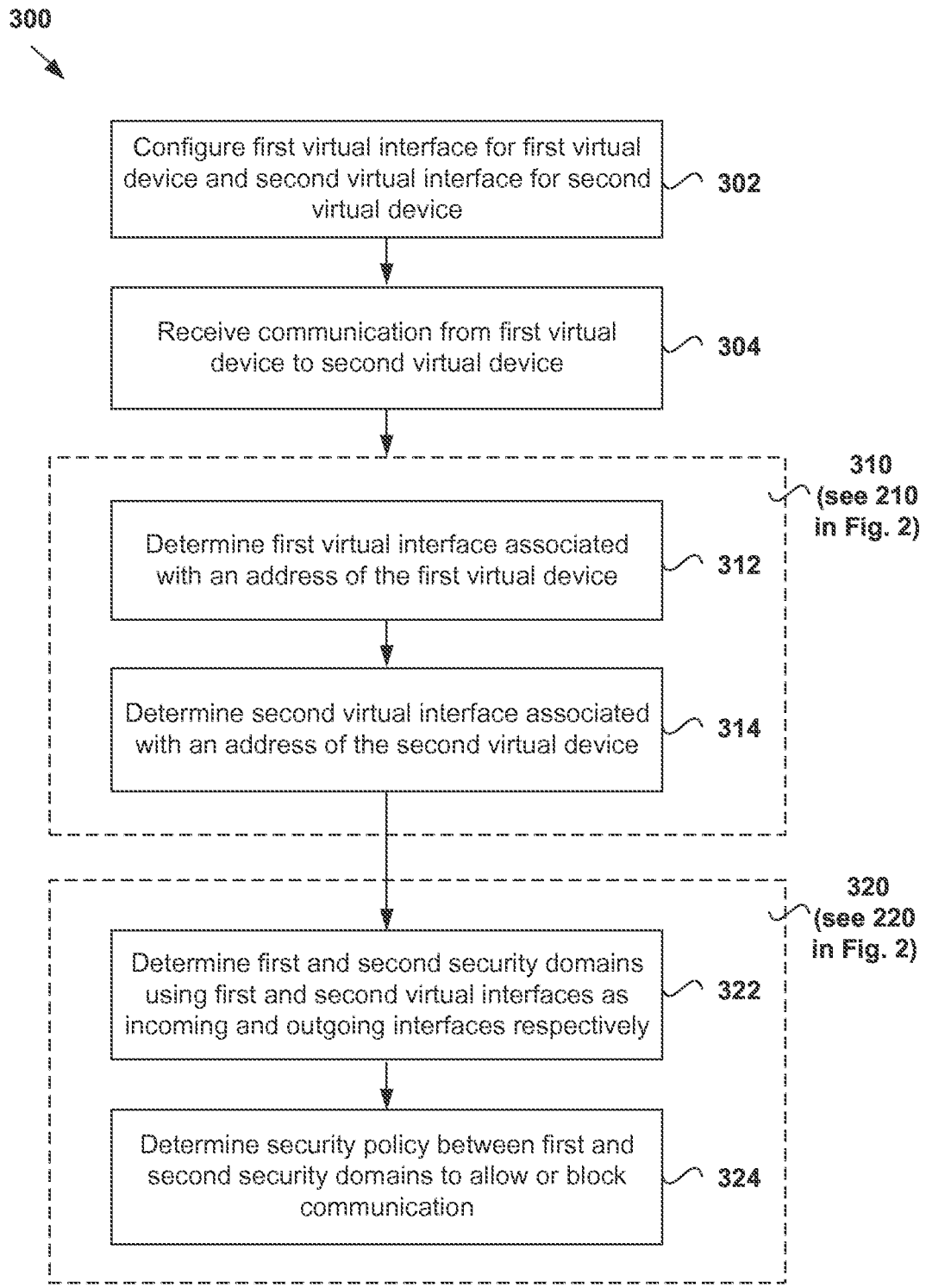
FIG. 3 is a flowchart of an example detailed implementation of the method in FIG. 2.

Referring to the example in FIG. 3, the virtual interfaces 112 may be pre-configured on the firewall device 110, i.e. the virtual interfaces 112 are configured at block 302 prior to receiving the communication at block 304.

In one example, each virtual interface 112 may be associated with an address set that includes an address of the corresponding virtual device 122, and a security domain. For example, the virtual interface 112 may be configured as follows:

```
{
    Virtual interface identifier;
    Address set;
    Security domain
}
```

In the example in FIG. 1, the following virtual interfaces 112 are configured on the firewall device 110:

First virtual interface 112 with first identifier VI1 is associated with first address set IG1 and first security domain SZ1. The address of VM1 (e.g. Address_VM1) is included in first address set IG1, and VI1 is added to first security domain SZ1.

Second virtual interface 112 with second identifier VI2 is associated with second address set IG2 and second security domain SZ2. The address of VM2 (e.g. Address_VM2) is included in second address set IG2, and VI2 is added to second security domain SZ2.

Security policies may then be defined and enforced for inter-domain communication to allow or block communication from one security domain to another. In the example in FIG. 1, the security policy 140 for communication between security domains SZ1 and SZ2 is to allow packets with its TCP port being 'Port X' to pass through, as indicated using a 'tick symbol'. Other packets will be blocked, as indicated using a 'cross' symbol.

The address of the virtual device 122 may be any suitable address, such as an Internet Protocol (IP) address or a Media Access Control (MAC) address etc. If a Dynamic Host Configuration Protocol (DHCP) server is used to dynamically obtain an IP address of a virtual device 122, IP addresses in the address set should be consistent with a strategy or allocation policy of the DHCP server. This is to ensure that the address set includes addresses assigned to a class of virtual devices 122 that require firewall security control, rather than being randomly assigned.

The address set associated with a virtual interface may be an address range. For example, if address set IG1 is a range of addresses, the address of VM1 will be within this range. Similarly, if address set IG2 is a range of addresses, the address of VM2 will be within this range. In this case, matching an address or finding an address associated with an address range should be understood as determining whether the address is within the range.

The virtual interfaces 112 may be configured based on information provided by users, including information on the address set and/or security domain.

Determining Virtual Interfaces 310

After receiving communication from the first virtual device 122 to the second virtual device 122 at block 304 in FIG. 3, the firewall device 110 determines first and second virtual interfaces 112 associated with first and second virtual devices 122 respectively.

Using the example in FIG. 1 again, first virtual device VM1 initiates a TCP connection on port X to send a packet to second virtual device VM2. The source address of the packet is the address of VM1 (i.e. Address_VM1), and its destination address is the address of VM2 (i.e. Address_VM2).

As shown at block 310 in FIG. 3 (which is related to block 210 in FIG. 2), determining the first and second virtual interfaces 112 by the firewall device 110 may further include:

At block 312 in FIG. 3, the firewall device 110 determines the first virtual interface 112 based on the source address 'Address_VM1'. For example, this may involve determining which virtual interface 112 has an address set that includes 'Address_VM1'. In this case, 'Address_VM1' belongs to address set IG1 of virtual interface VI1. The incoming interface of the communication is then temporarily set to the first virtual interface VI1 at the firewall device 110.

At block 314 in FIG. 3, the firewall device 110 determines the second virtual interface 112 based on the with the destination address 'Address_VM2' of the received communication. In the example in FIG. 1, 'Address_VM2' belongs to address set IG2 of the second virtual interface VI2. The outgoing interface of the communication is temporarily set to second virtual interface VI2 at the firewall device 110.

Determining Security Domains 320

Based on the first and second virtual interfaces 112, the firewall device 110 then determines first and second security domains associated with the first and second virtual interfaces 112 respectively. This is to implement a security policy 140 between the security domains to allow or block the communication.

As shown at block 320 in FIG. 3 (which is related to block 220 in FIG. 2), determining the first and second security domains may further include:

At block 322 in FIG. 3, the firewall device 110 determines first security domain (i.e. SZ1) associated with the first virtual interface (i.e. VI1), and second security domain (i.e. SZ2) associated with the second virtual interface (i.e. VI2).

At block 324 in FIG. 3, the firewall device 110 determines a security policy 140 between the first and second security domains, i.e. SZ1 and SZ2. In the example in FIG. 1, the security policy 140 between SZ1 and SZ2 is to allow packets utilizing TCP 'Port X' to pass through, as indicated by a 'tick' symbol. Other packets will be blocked, as indicated by a 'cross' symbol.

Thus in this example, the security policy 140 allows inter-domain communication for packets or messages from VM1 which utilize a TCP connection on port X; see 150 in FIG. 1. As such, the communication is then sent to its destination, i.e. second virtual device VM2.

The communication may be forwarded by the firewall device 110 or a different device (not illustrated for simplicity). This may involve determining an outgoing interface according to a forwarding table (e.g. MAC forwarding table etc.) to forward the packet to VM2. In the example in FIG. 1, the incoming interface and outgoing interface are both set to TCP Port X again when the communication is forwarded.

Additional Examples

Figure 4:
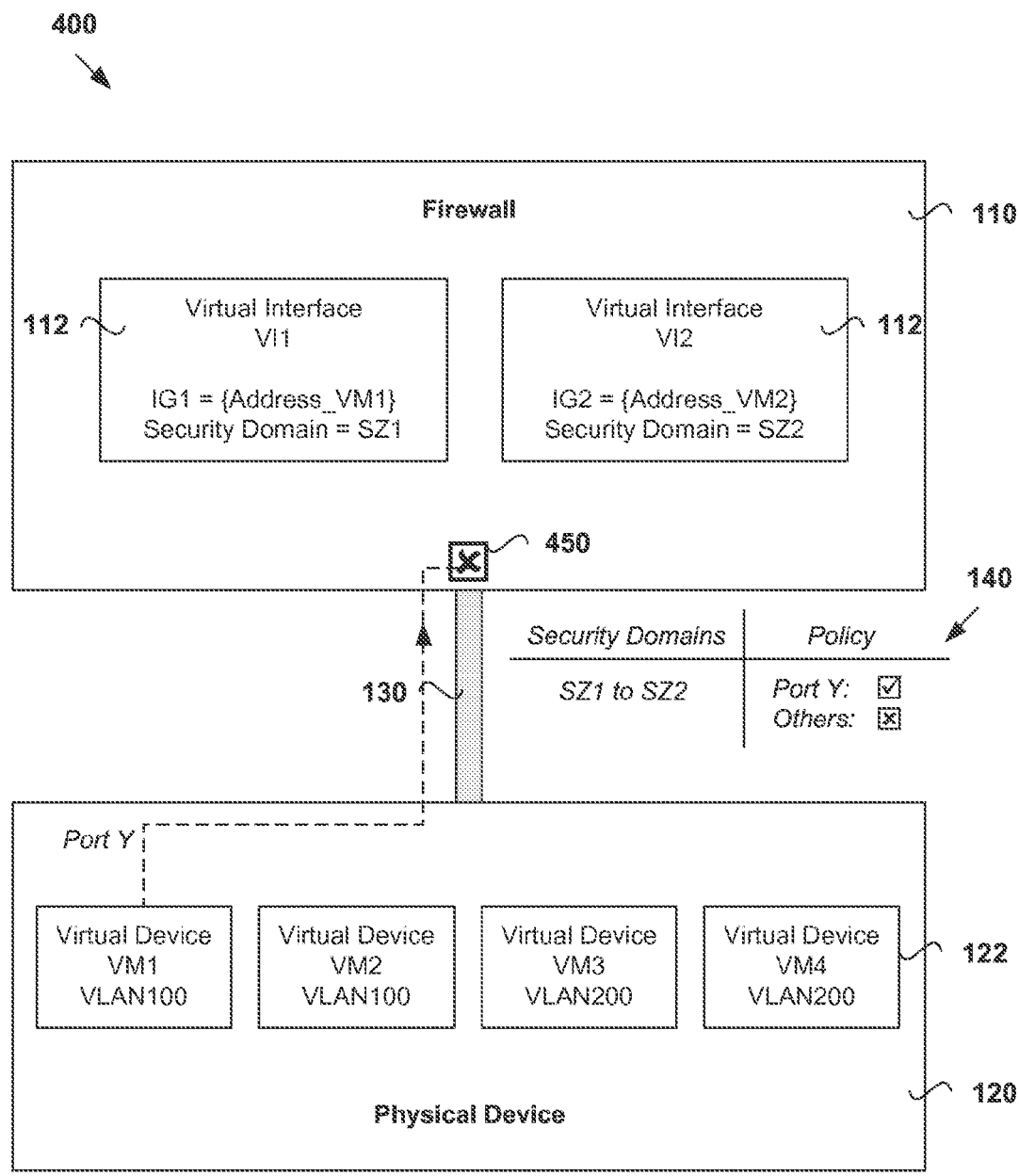
FIG. 4 is a block diagram of the example network in FIG. 1 according to an example in which communication between a first virtual device and a second virtual device is blocked.

Another example is shown in FIG. 4, in which virtual interfaces VI1 and VI2 are pre-configured for virtual devices VM1 and VM2 respectively similar to FIG. 1. However, FIG. 4 differs from the example of FIG. 1 in that the communication is blocked. In this example, VM1 initiates a TCP connection with VM2 using a different port Y which is not allowed by the security policy, instead of port X which is allowed.

As in the previous example, when a packet is received from VM1 for VM2, the firewall device 110 determines their respective virtual interfaces as VI1 and VI2, and security domains as SZ1 and SZ2. However, in this case, since the TCP port used is 'Port Y', the corresponding security policy 140 is to block the packet as indicated by the 'cross' symbol 450 in FIG. 4. The packet is discarded and will not be received by VM2.

Figure 5:
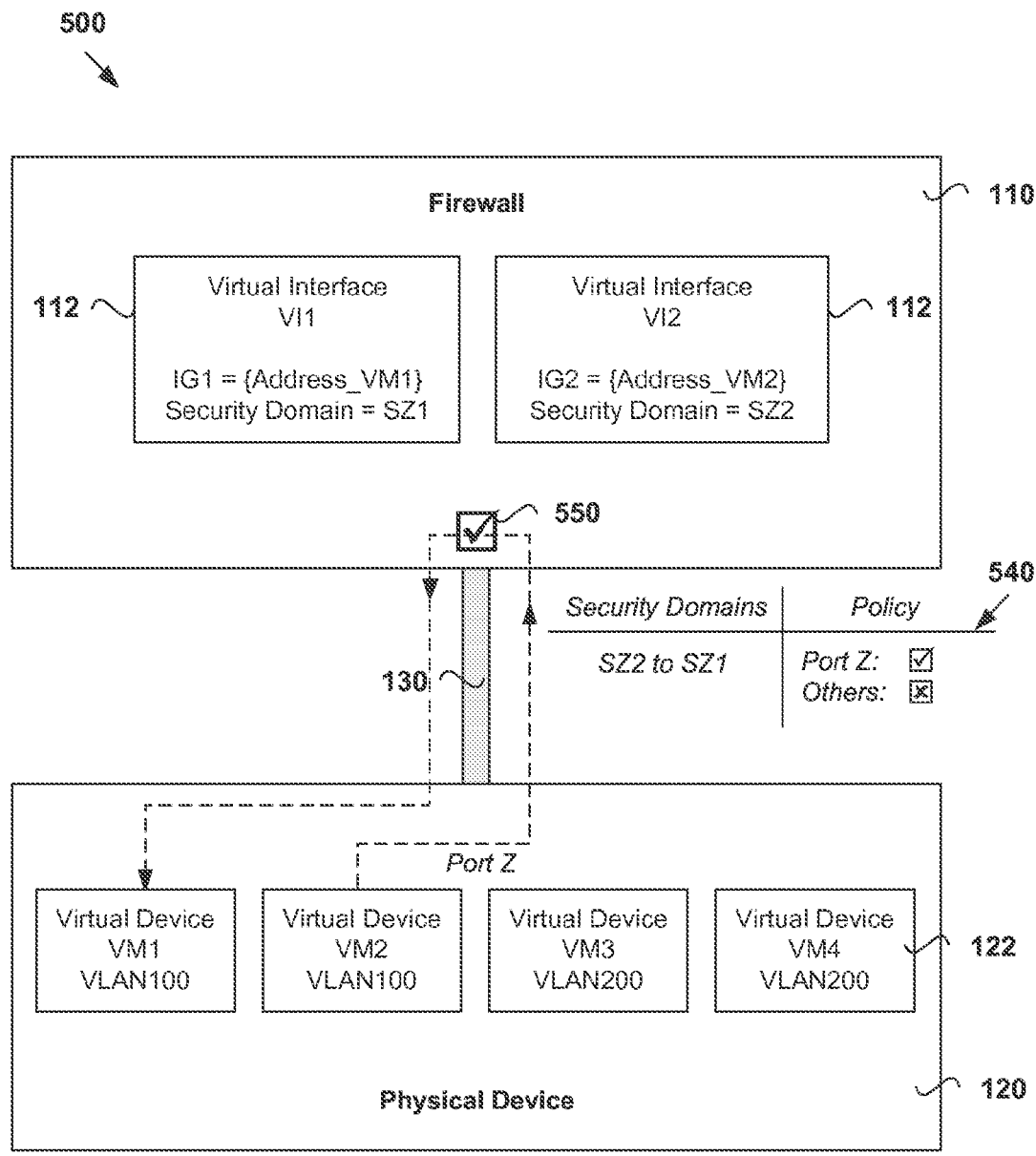
FIG. 5 is a block diagram of the example network in FIG. 1 according to a further example in which communication between a first virtual device and a second virtual device is allowed.

A further example is shown in FIG. 5, in which virtual device VM2 wishes to send a packet to virtual device VM1. In this example, VM2 initiates a TCP connection with VM1 using 'Port Z'. Unlike the examples in FIG. 1 and FIG. 4, VM2 is now the "first virtual device" because it initiated the communication, and VM1 the "second virtual device" as it is the intended destination of the communication. Further, a new security policy 540 has already been configured for communication from VM2 to VM1, which only allows packets utilizing TCP 'Port Z' from VM2.

Note that since virtual interfaces VI2 and VI1 are already configured for VM2 and VM1 respectively, the configuration process does not have to be repeated. When a packet indicating 'Port Z' as its TCP port is received from VM2, the firewall device 110 performs the processes in FIG. 2 and FIG. 3 to allow the forwarding of the packet to second virtual device VM1. This is indicated by the 'tick' symbol 550 in FIG. 5.

Based on the examples provided, it should be understood that virtual interfaces VI1 and VI2 may be used by the firewall device 110 as temporary or internal labels for incoming and outgoing interfaces. This allows the firewall device 110 to determine the corresponding security domains SZ1 and SZ2 and security policy 140. The virtual interfaces VI1 and VI2 are not used during packet forwarding. In FIG. 1, TCP Port X is used in the actual packet forwarding to VM2. In FIG. 5, TCP Port Z is used in the actual packet forwarding to VM1.

Although not illustrated in the figures, different virtual devices 122 may share the same virtual interface 112. For example in FIG. 1, VM1 may share virtual interface VI1 with another virtual device, e.g. VM3. This configuration is suitable if no security policies between VM1 and VM3 are required, and the security policies relating to communication with external security domains apply to both. Further, a security domain (e.g. SZ1) may be associated with multiple virtual interfaces. For example, in addition to VI1 in FIG. 1, another virtual interface VI3 for VM3 may be added to security domain SZ1. In this case, security policies associated with security domain SZ1 will apply for both VI1 and VI3.

Firewall Device 110

Figure 6:
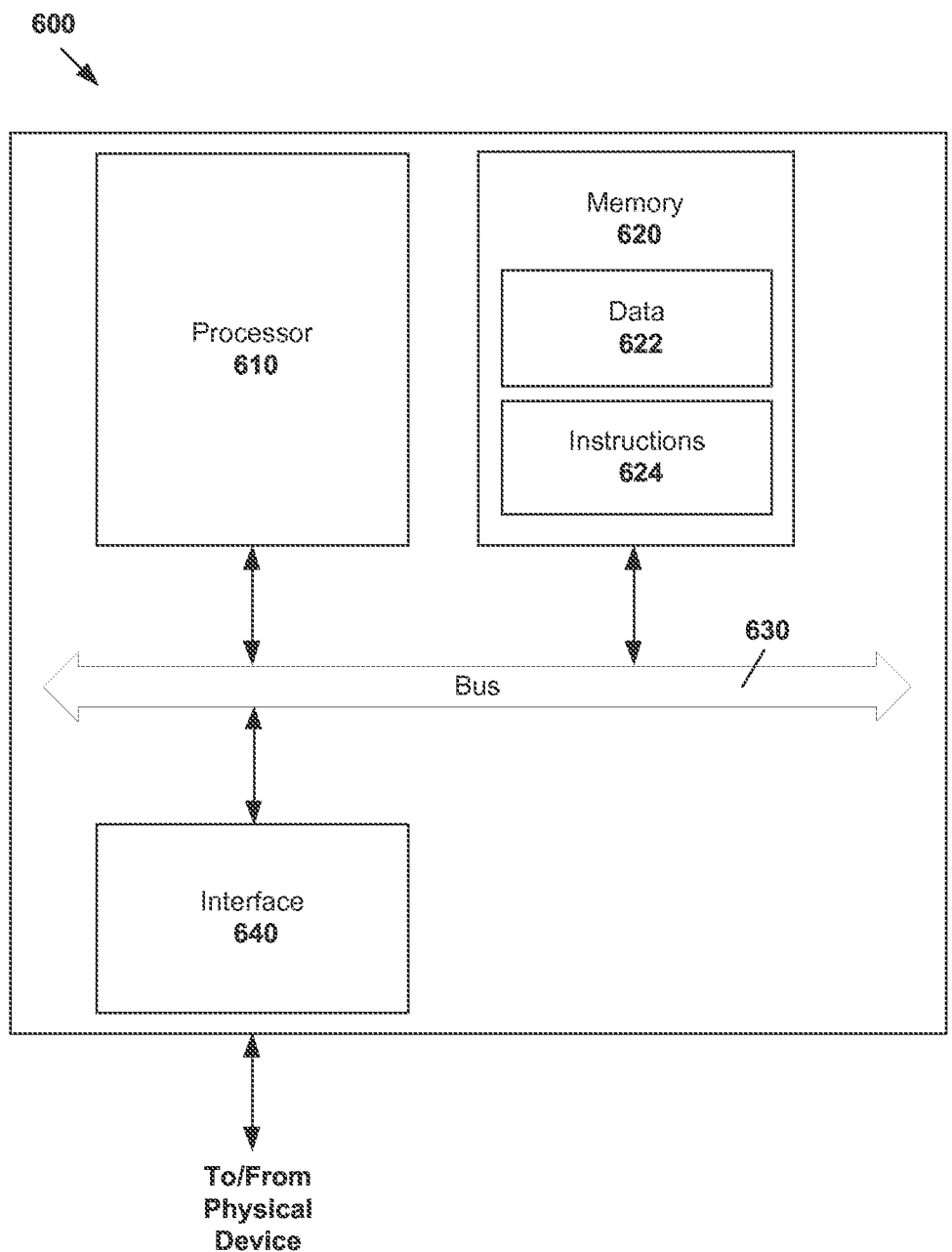
FIG. 6 is a block diagram of an example structure of a device capable of acting as a firewall in FIG. 1.

FIG. 6 shows a block diagram of an example device capable of acting as a firewall device 110/600 for firewall security between virtual devices 122 on a physical device 120. The example network device 600 includes a processor 610; memory 620 storing necessary data 622 and machine-readable instructions 624; and network interface 640 that facilitates communication with the physical device 120. The processor 610, memory 620 and interface 640 communicate with each other via a bus 630.

The processor 610 is to perform processes or operations described with reference to the figures, including:

when communication from a first virtual device 122 to a second virtual device 122 is received, determine a first virtual interface 112 associated with the first virtual device 122 and a second virtual interface 112 associated with the second virtual device 122; and determine a first security domain associated with the first virtual interface 112 and a second security domain associated with the second virtual interface 112 to implement a security policy between the first security domain and second security domain to allow or block the communication.

Figure 7:
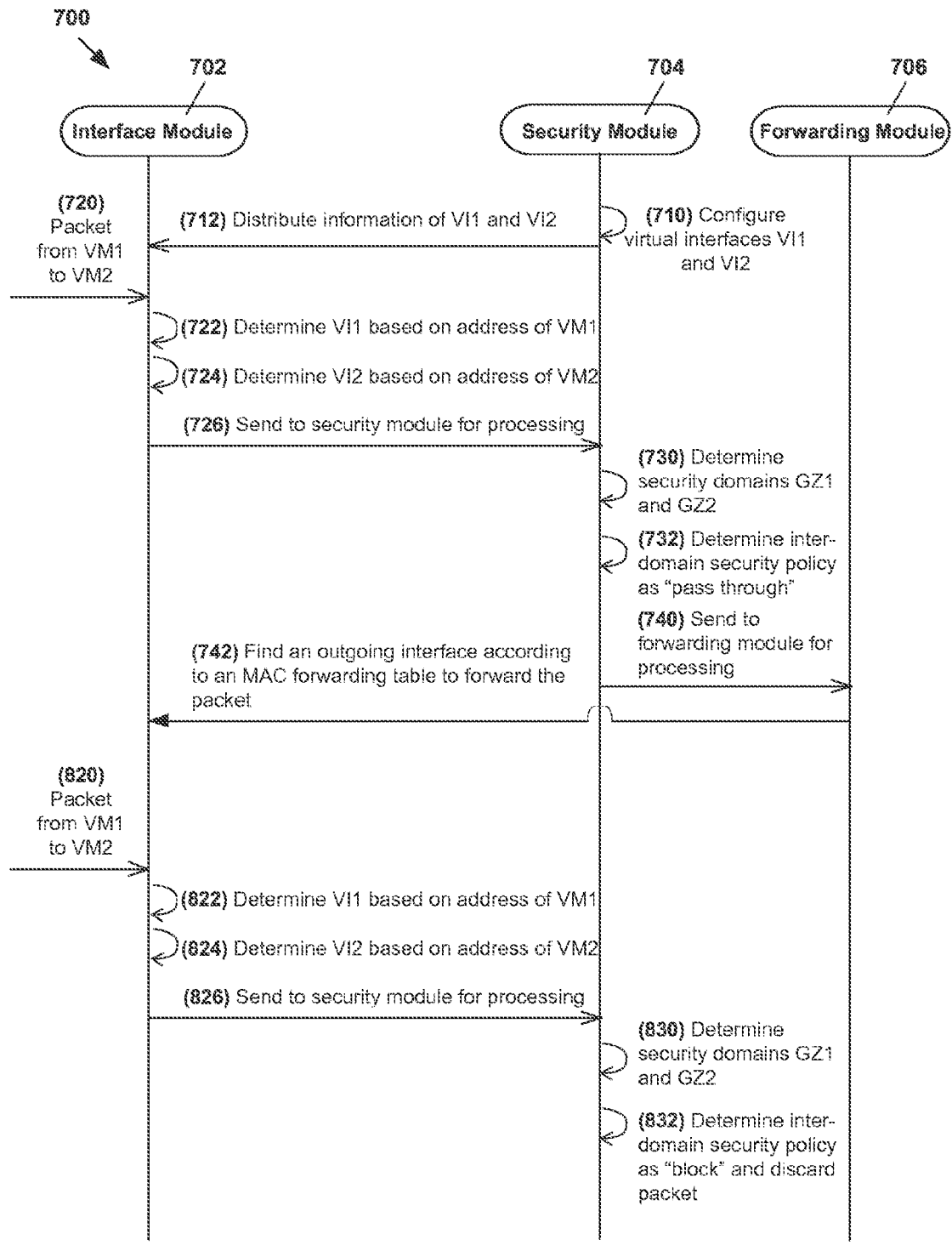
FIG. 7 is a flow diagram of example modules of the device in FIG. 6.

In another example, the machine-readable instructions 624 may cause the processor 610 to implement one or more modules, such as an interface module 702, security module 704 and forwarding module 706 in FIG. 7.

(i) Operations 710 to 742 performed by the modules in FIG. 7 are related to the example in FIG. 1:

The security module 704 is to configure the first and second virtual interfaces 112, each being associated with an address set and a security domain; see 712. The information of the virtual interfaces 112 is then distributed to the interface module 702 for processing; see 714.

A communication from the first virtual device VM1 to second virtual device VM2 is received by the interface module 702; see 720. The interface module 702 determines the corresponding virtual interfaces as VI1 and VI2 that have already been configured for virtual devices VM1 and VM2 respectively; see 722 and 724. The result is sent to the security module 704 for processing; see 726.

The security module 704 determines the security domains associated with VI1 and VI2 as SZ1 and SZ2 respectively; see 730. The security module 704 then determines the inter-domain security policy between SZ1 and SZ2 for the communication as "pass through"; see 732 and FIG. 1 again.

The result is sent to the forwarding module 706, which determines an outgoing interface for the communication according to a forwarding table; see 740 and 742.

(ii) Operations 820 to 832 performed by the modules in FIG. 7 are related to the example in FIG. 4.

An abnormal communication from the first virtual device VM1 to second virtual device VM2 is received by the interface module 702; see 820. The interface module 702 determines the corresponding virtual interfaces as VI1 and VI2; see 822 and 824. The result is sent to the security module 704 for processing; see 826.

The security module 704 determines the security domains associated with VI1 and VI2 as SZ1 and SZ2 respectively; see 830. The security module 704 then determines the inter-domain security policy between SZ1 and SZ2 for the abnormal communication as "block"; see 832 and FIG. 1 again. The associated packet is discarded.

Other operations, processes and/or procedures discussed with reference to FIG. 1 to FIG. 5 are also applicable here.

The methods, processes, functional units and modules described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors 710; reference in this disclosure or the claims to a 'processor' should thus be interpreted to mean 'one or more processors'.

Although one network interface device 640 is shown in FIG. 6, processes performed by the network interface device 640 may be split among multiple network interface devices (not shown for simplicity). As such, reference in this disclosure to a 'network interface device' should be interpreted to mean 'one or more network interface devices'.

Further, the processes, methods and functional units described in this disclosure may be implemented in the form of a computer software product. The computer software product is stored in a storage medium and comprises a plurality of machine-readable instructions for making a processor to implement the methods recited in the examples of the present disclosure.

The figures are only illustrations of an example, wherein the modules, units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

As used in the present disclosure, the singular forms "a," "an," and "the" are intended to include the plural forms as well, unless expressly stated otherwise. It should be further understood that the terms "comprises" and/or "comprising" when used in this specification are taken to specify the presence of stated features, integers, steps, operations, elements, and/or components, but do not preclude the presence or addition of one or more other features, integers, steps, operations, elements, components, and/or groups thereof. As used in the present disclosure, the term "and/or" includes any and all combinations of one or more of the associated listed items.

It should also be understood that although the terms 'first', 'second' etc. may have been used herein to describe various elements, these elements should not be limited by these terms. These terms are only used to distinguish one element from another. For example, "first virtual interface" could be termed "second virtual interface", and, similarly, "second virtual interface" could be termed "first virtual interface", without departing from the scope of the present disclosure. In this example, the "first virtual interface" and "second virtual interface" are not the same interfaces.

It will be appreciated that numerous variations and/or modifications may be made to the processes, methods and functional units as shown in the examples without departing from the scope of the disclosure as broadly described. The examples are, therefore, to be considered in all respects as illustrative and not restrictive.

The invention claimed is:

1. A method for firewall security between virtual devices-on-a, the method comprising:
   receiving by a physical interface of a firewall device, a communication from a first virtual device to a second virtual device, wherein the first virtual device is hosted on a physical device which is separate from the firewall device and the second virtual device is hosted on a physical device which is separate from the firewall device;
   determining, by the firewall device, a first virtual interface associated
   with the first virtual device based on an address of the first virtual device and an address set of the first virtual interface;
   determining, by the firewall device, second virtual interface associated with the
   second virtual device based on an address of the second virtual device and an address set of the second virtual interface;
   determining, by the firewall device, a first security domain associated with the first virtual interface and a second security domain associated with the second virtual interface; and
   to-implementing, by the firewall device, a security policy between the first
   security domain and second security domain;
   wherein implementing the security policy comprises blocking the communication based on the security policy, or allowing the communication based on the security policy, wherein allowing the communication includes forwarding the communication to the second virtual device;
   wherein if the address of the first virtual device and/or address of the second virtual device are dynamically obtained from a Dynamic Host Configuration Protocol (DHCP) server, the first address set and second address set are configured based on a policy of the DHCP server.

2. The method of claim 1, wherein the first virtual interface and second virtual interface are used as labels for incoming interface and outgoing interface of the communication respectively to determine the first security domain and second security domain, and are not used when the communication is forwarded.

3. The method of claim 1, wherein the first virtual interface and second virtual interface are configured for the first virtual device and second virtual device respectively prior to receiving the communication.

4. The method of claim 3, wherein:
   the first virtual interface is configured as being associated with a first identifier, the first security domain and a first address set that includes an address of the first virtual device; and the second virtual interface is configured as being associated with a second identifier, the second security domain and a second address set that includes an address of the second virtual device.

5. The method of claim 4, wherein the address of the first virtual device or second virtual device is an Internet Protocol (IP) address or Media Access Control (MAC) address.

6. A firewall device for firewall security between virtual devices, the firewall device comprising:
   a physical interface to receive a communication from a first virtual device hosted on a physical device which is separated from the firewall device,
   the communication having a destination of a second virtual device which is hosted on a physical device which is separate from the firewall device; and a processor to;
   determine a first virtual interface associated with the first virtual
   device based on an address of the first virtual device and an address set of the first virtual interface;
   determine a second virtual interface associated with the second virtual
   device based on an address of the second virtual device and an address set of the second virtual interface;
   determine a first security domain associated with the first virtual interface and a second security domain associated with the second virtual interface to implement a security policy between the first security domain and second security domain; and
   block the communication or forward the communication to the second virtual device based on the security policy;
wherein if the address of the first virtual device and/or address of the second virtual device are dynamically obtained from a Dynamic Host Configuration Protocol (DHCP) server the processor is to configure the first address set and second address set based on an allocation policy of the DHCP server.

7. The device of claim 6, wherein the processor is to use the first virtual interface and second virtual interface as labels for incoming interface and outgoing interface of the communication respectively to determine the first security domain and second security domain, and not when the communication is forwarded.

8. The device of claim 6, wherein the processor is to configure the first virtual interface and second virtual interface for the first virtual device and second virtual device respectively prior to receiving the communication.

9. The device of claim 8, wherein the processor is to:
   configure the first virtual interface as being associated with a first identifier, the first security domain and a first address set that includes an address of the first virtual device; and
   configure the second virtual interface as being associated with a second identifier, the second security domain and a second address set that includes an address of the second virtual device.

10. The device of claim 9, wherein the address of the first virtual device or second virtual device is an Internet Protocol (IP) address or Media Access Control (MAC) address.

* * * * *